(12) United States Patent
Lee et al.

(10) Patent No.: US 9,591,654 B2
(45) Date of Patent: Mar. 7, 2017

(54) WIRELESS COMMUNICATION APPARATUS FOR REDUCING INTERFERENCE WITH NEIGHBORING CELL AND METHOD OF REDUCING INTERFERENCE THEREOF

(71) Applicant: Electronics and Telecommunications Research Institute, Daejeon (KR)

(72) Inventors: Dong Hun Lee, Daejeon (KR); Kyu Min Kang, Daejeon (KR); Jae Cheol Park, Daejeon (KR); Byung Jang Jeong, Daejeon (KR); Jae Ick Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 212 days.

(21) Appl. No.: 14/288,477

(22) Filed: May 28, 2014

(65) Prior Publication Data

US 2015/0245363 A1 Aug. 27, 2015

(30) Foreign Application Priority Data

Feb. 24, 2014 (KR) ........................ 10-2014-0021489

(51) Int. Cl.
*H04W 72/08* (2009.01)
*H04W 24/02* (2009.01)
*H04W 84/04* (2009.01)
*H04W 72/04* (2009.01)

(52) U.S. Cl.
CPC ......... *H04W 72/082* (2013.01); *H04W 24/02* (2013.01); *H04W 72/0426* (2013.01); *H04W 84/045* (2013.01)

(58) Field of Classification Search
CPC .......... H04W 72/0426; H04W 72/082; H04W 84/10; H04W 84/105; H04W 24/02; H04W 72/06; H04W 24/10; H04W 36/0083; H04W 84/045
See application file for complete search history.

(56) References Cited

U.S. PATENT DOCUMENTS

| 2011/0305293 | A1 | 12/2011 | Choi et al. | |
| 2012/0064904 | A1* | 3/2012 | Lee | H04W 72/082 455/450 |

FOREIGN PATENT DOCUMENTS

KR 1020110136249 A 12/2011

* cited by examiner

*Primary Examiner* — Nam Huynh
(74) *Attorney, Agent, or Firm* — William Park & Associates Ltd.

(57) ABSTRACT

Disclosed are a wireless communication apparatus for reducing interference by a neighboring cell, and a method of reducing interference thereof. The method of reducing interference by a wireless communication apparatus includes: determining a neighboring small cell from one or more surrounding small cells adjacent to a small cell; allocating a communication resource to one or more users according to a channel state of the one or more users subscribing to the small cell; and transmitting data to the one or more users, to which the communication resource is allocated, by adopting one or more interference reducing methods for reducing interference by the neighboring small cell.

9 Claims, 5 Drawing Sheets

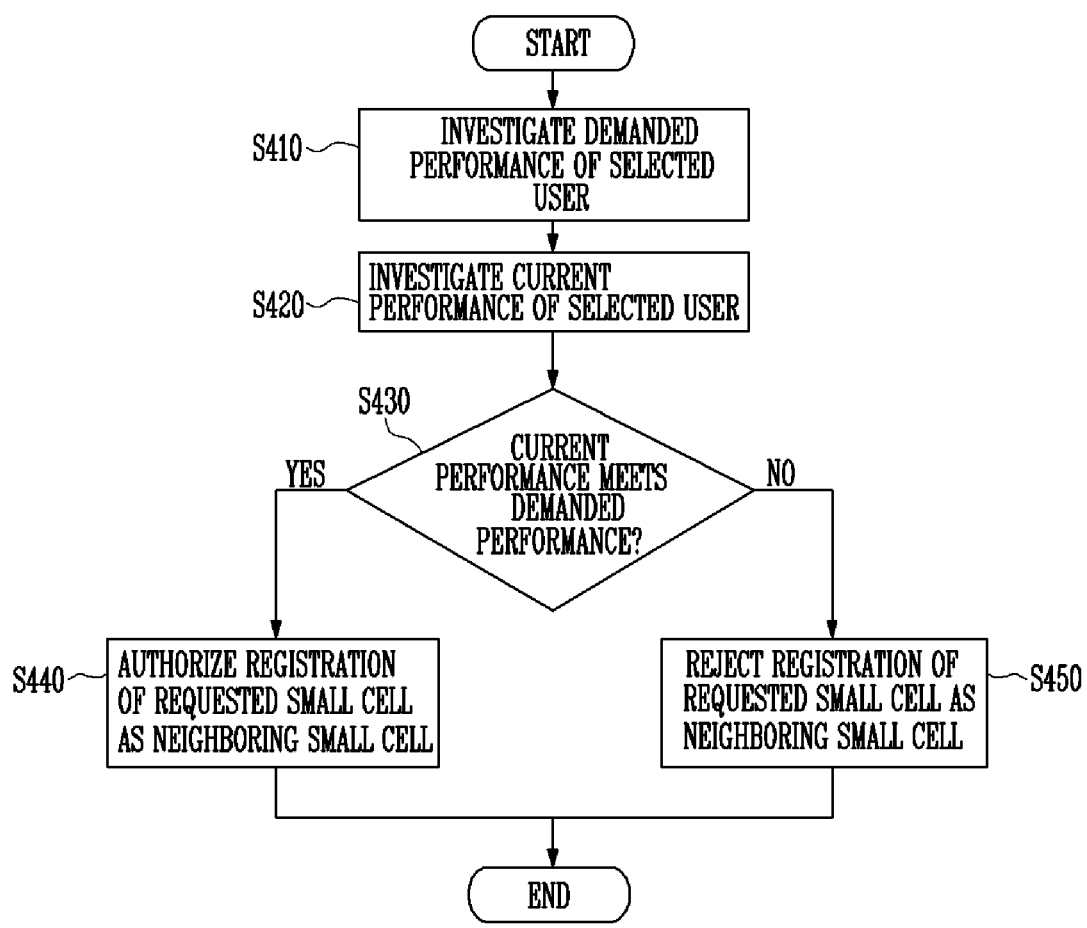

WIRELESS COMMUNICATION APPARATUS FOR REDUCING INTERFERENCE WITH NEIGHBORING CELL AND METHOD OF REDUCING INTERFERENCE THEREOF

CROSS-REFERENCE TO RELATED APPLICATION

This application is based on and claims priority from Korean Patent Application No. 10-2014-0021489, filed on Feb. 24, 2014, with the Korean Intellectual Property Office, the disclosure of which is incorporated herein in its entirety by reference.

BACKGROUND

1. Field

The present invention relates to a wireless communication apparatus and a method of controlling the same, and more particularly, to a wireless communication apparatus for reducing interference by a neighboring cell, and a method of reducing interference thereof.

2. Discussion of Related Art

As demands for various multimedia services through mobile wireless communication have been recently increased, various research for improving efficiency of use of a frequency of a wireless communication system and a capacity of the system has been conducted. For example, in order to improve the efficiency of the use of the frequency, research on a cognitive radio communication system enabling a second user to use a band which a first user does not use has been actively conducted, and on the other hand, in order to improve a capacity of the system, research on a small cell technology having an advantage of a cost-effective backhaul connectivity in indoor and outdoor environments, simple installation, and low installation cost has been actively conducted.

The small cell technology includes an open access method and a closed access method. The open access method is a method of allowing any user subscribing to a small cell to access the most efficient small cell, and the closed access method is a method of allowing only a permitted user to access a specific small cell. The closed access method may be effective in managing wireless resources and user security, but neighboring small cells use the same frequency, so that there is a disadvantage in that severe interference may be caused between the neighboring small cells.

In order to solve an interference problem by the use of the same frequency between the small cells, various interference reducing methods have been suggested. One of the suggested methods is an interference alignment method of concentrating an interference signal at a transmission terminal to a specific signal region to maximize a degree of freedom of the remaining signal regions. That is, according to the method, interference is concentrated to one signal region among several signal regions, and a signal is substantially transmitted through the remaining signal regions. However, in the interference alignment method, the small cells need to share all of channel information between the small cells, so that the amount of backhaul data is increased, and thus calculation of the system is complicated. Another one of the methods is a Zero Forcing pre-processing method of removing interference of a user subscribing to a neighboring small cell by a small cell. In the ZF pre-processing method, when there is a user influenced by a small cell itself among users subscribing to a neighboring small cell, the small cell removes the interference of the user subscribing to the neighboring small cell by performing the ZF pre-processing. In this case, only channel information about a user, of which interference is to be removed, is required, so that there is an advantage in that the amount of backhaul data is smaller than that of the interference alignment method, but there is a disadvantage in that a degree of freedom is relatively small, so that a capacity of a system is decreased compared to the interference alignment method.

Accordingly, an interference reducing method of reducing interference between neighboring cells, and decreasing calculation complexity of a system and improving a capacity of the system compared to the method in the related art has been demanded.

SUMMARY

The present invention has been made in an effort to provide a wireless communication apparatus capable of reducing interference between the wireless communication apparatus and neighboring cells, decreasing calculation complexity of a necessary system, and increasing a capacity of a system, and a method of reducing interference thereof.

An exemplary embodiment of the present invention provides a method of reducing interference by a wireless communication apparatus, including: determining a neighboring small cell from one or more surrounding small cells adjacent to a small cell; allocating a communication resource to one or more users according to a channel state of the one or more users subscribing to the small cell; and transmitting data to the one or more users, to which the communication resource is allocated, by adopting one or more interference reducing methods for reducing interference by the neighboring small cell.

The determining of the neighboring small cell may include: comparing demanded performance and current performance of the one or more users; and determining one or more surrounding small cells among the one or more surrounding small cells as the neighboring small cells according to a result of the comparison.

The one or more surrounding small cells may have a largest amount of interference for the small cell among the one or more surrounding small cells.

The one or more surrounding small cells may be closest to the small cell among the one or more surrounding small cells.

The demanded performance may be a demanded transmission capacity of the one or more users, the current performance may be a current transmission capacity of the one or more users, and the current transmission capacity may be calculated by referring to a signal to noise ratio of the one or more users for each data stream, and the maximum number of transmission streams of the one or more users.

The current transmission capacity may be calculated by $$C_u = \sum_{i=1}^{S_u} \log_2(1 + \gamma_i^u),$$

u is a natural number equal to or larger than 1 and equal to or smaller than n, n indicates the number of one or more users, i indicates an index of a data stream to be transmitted to the one or more users by the wireless communication apparatus, $C_u$ indicates a current transmission capacity of a $u^{th}$ user among the one or more users, $S_u$ indicates the maximum number of transmission streams of the $u^{th}$ user, and $\gamma_i^u$ indicates a signal to noise ratio for an $i^{th}$ stream of the $u^{th}$ user.

The determining of the neighboring small cell may further include calculating the current performance again based on remaining surrounding small cells except for the one or more surrounding small cells among one or more surrounding small cells after determining the one or more surrounding small cells as the neighboring small cell.

The method may further include receiving user information or small cell information from a macro cell, the one or more users, or the one or more surrounding small cells.

The allocating of the communication resource to the one or more users may include: selecting a specific user among the one or more users for each of data streams according to a signal to noise ratio for each of the data streams to be transmitted by the wireless communication apparatus; comparing the number of data streams selected for the specific user among the data streams and the maximum number of transmission streams of the specific user; and allocating all or a part of the data streams selected for the specific user to the specific user according to a result of the comparison.

The method may further include allocating a data stream, which is not allocated to the specific user, among the data streams selected for the specific user to a user different from the specific user among the one or more users.

The selecting of the specific user among the one or more users for each of the data streams may include selecting a user having a largest signal to noise ratio for each of the data streams as the specific user.

The method may further include making, by the neighboring small cell, a request for registration of the small cell as a neighboring small cell of the neighboring small cell in response to the determination of the neighboring small cell.

The request may be transmitted to the neighboring small cell via a macro cell.

The neighboring small cell may authorize or reject the request based on demanded performance and current performance of at least some of the one or more users in response to the request.

Another exemplary embodiment of the present invention provides a wireless communication apparatus, including: a searching unit configured to determine a neighboring small cell from one or more surrounding small cells adjacent to a small cell; a scheduler configured to allocate a communication resource to one or more users according to a channel state of the one or more users subscribing to the small cell; and an interference reducing unit configured to reduce interference by the neighboring small cell in order to transmit data to the one or more users to which the communication resource is allocated.

According to the exemplary embodiments of the present invention, surrounding small cells are selectively determined as the neighboring small cells, thereby decreasing calculation complexity of the system necessary for reducing the interference.

Further, a communication resource is preferentially allocated to a user having a good channel situation through the scheduling method, thereby generally improving performance and a capacity of the system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIG. 7 is a flowchart illustrating a method of authorizing registration of a neighboring small cell in stepwise according to exemplary embodiments of the present invention.

DETAILED DESCRIPTION

Figure 1:
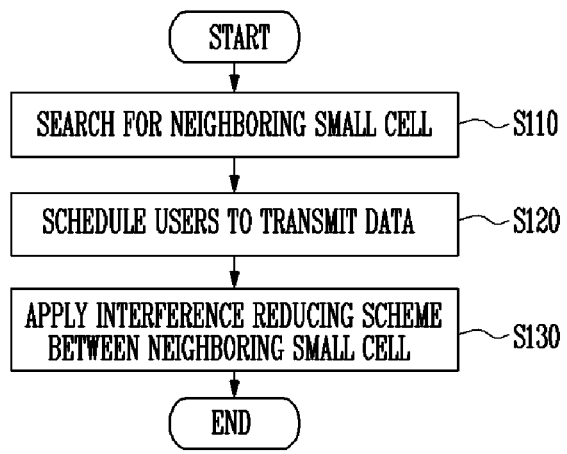
FIG. 1 is a flowchart schematically illustrating a method of reducing interference according to an exemplary embodiment of the present invention.

The present invention will be described with reference to the accompanying drawings based on a specific embodiment in which the present invention may be carried out as an example. It should be understood that various embodiments of the present invention are different from each other, but need not to be mutually exclusive. For example, a specific figure, a structure, and a characteristic described herein may be implemented as another embodiment without departing from a spirit and a scope of the present invention in relation to an embodiment.

Further, it should be understood that a position or a displacement of an individual constituent element in each disclosed embodiment may be changed without departing from the spirit and the scope of the present invention. Accordingly, the detailed description below is not intended as a limited meaning, and the scope of the present invention is defined by the appended claims in principle, and includes the matters defined in the claims, and exemplary embodiments available within the scope equivalent to the scope of the claims. When like reference numeral numbers are used in the drawings, like reference numerals designate like or similar functions throughout the several exemplary embodiments.

Hereinafter, contents and the spirit of the present invention will be described through particular exemplary embodiments with reference to the accompanying drawings.

The present invention improves a capacity of a system and calculation complexity by a method of searching for a neighboring small cell and scheduling users by a predetermined method in order to overcome interference between neighboring small cells in, for example, a cognitive radio communication system using a white space band.

FIG. 1 is a flowchart schematically illustrating a method of reducing interference according to an exemplary embodiment of the present invention. Referring to FIG. 1, the method of reducing interference includes operations S110 to S130.

In FIG. 1, the method of reducing interference transmits a data stream by adopting an interference reducing technology of searching for a neighboring small cell influencing on a small cell, scheduling users in an order of a user having a good channel situation, The method of reducing interference of FIG. 1 will be described in more detail below.

In step S110, a wireless communication apparatus searches for a neighboring small cell in surrounding small cells. In this case, the wireless communication apparatus may set target small cells based on a physical distance with a small cell, to which the wireless communication apparatus belongs, a communication state, or signal intensity, and determine at least some small cells meeting a predetermined condition among the target small cells as neighboring small cells.

For example, in the case where the number of neighboring small cells is excessive large, the number of calculations, which need to be performed for adopting the interference reducing scheme is excessively increased, and the calculation becomes complicated. However, in the case where the number of neighboring small cells is set to be excessive small, some small cells, which need to be considered when adopting the interference reducing scheme, are ignored, so that an effect of the interference reduction is considerably decreased.

Accordingly, in operation S110, the wireless communication apparatus determines a minimum number of small cells as neighboring small cells within a limit meeting demanded performance of each of the users by referring to performance information about small cells to provide a communication service and users. The method of determining, by the wireless communication apparatus, the neighboring small cells will be described in more detail with reference to FIG. 3.

In operation S120, the wireless communication apparatus schedules users to transmit a data stream. The wireless communication apparatus preferentially allocates a communication resource (or a data stream) in an order of a user having a good channel situation by referring to the performance information about each of the users.

For example, the wireless communication apparatus allocates the communication resource to each of the user by a method of preferentially allocating the data stream to a user having the largest Signal To Noise Ratio (SINR) for each data stream according to the SINR, and sequentially allocating the data stream, which may not be allocated or is not appropriate to allocation (for example, in the case where the number of allocated data streams is larger than the maximum number of transmission streams of the user), to a user having a next large SINR.

The method of allocating, by the wireless communication apparatus, the communication resource (or the data stream) will be described in more detail with reference to FIG. 4.

In operation S130, the wireless communication apparatus transmits data to each of the users to which the communication resource (or the data stream) is allocated in operation S120 by adopting the interference reducing scheme between the wireless communication apparatus and the neighboring small cells determined in operation S110. An interference reducing scheme well-known in the technical field in the art (for example, an interference alignment method, a ZF preprocessing method, or other general interference reducing schemes) may be used as the interference reducing scheme used in operation S130. Detailed contents of the interference reducing scheme are widely known in the technical field in the art, so that detailed descriptions thereof will be omitted.

According to the exemplary embodiment of the present invention, the minimum number of small cells is determined as the neighboring small cells within the limit meeting the demanded performance of each of the users, so that the number of necessary calculations and calculation complexity are minimized when the interference reducing scheme is applied. Further, the data is transmitted by preferentially allocating the communication resource (or the data stream) in the order of the user having a good channel situation, thereby optimizing performance of the system, and maximally using a capacity of the system.

Hereinafter, the wireless communication apparatus and the method of reducing interference described with reference to FIG. 1 will be described in detail through more specific examples.

Figure 2:
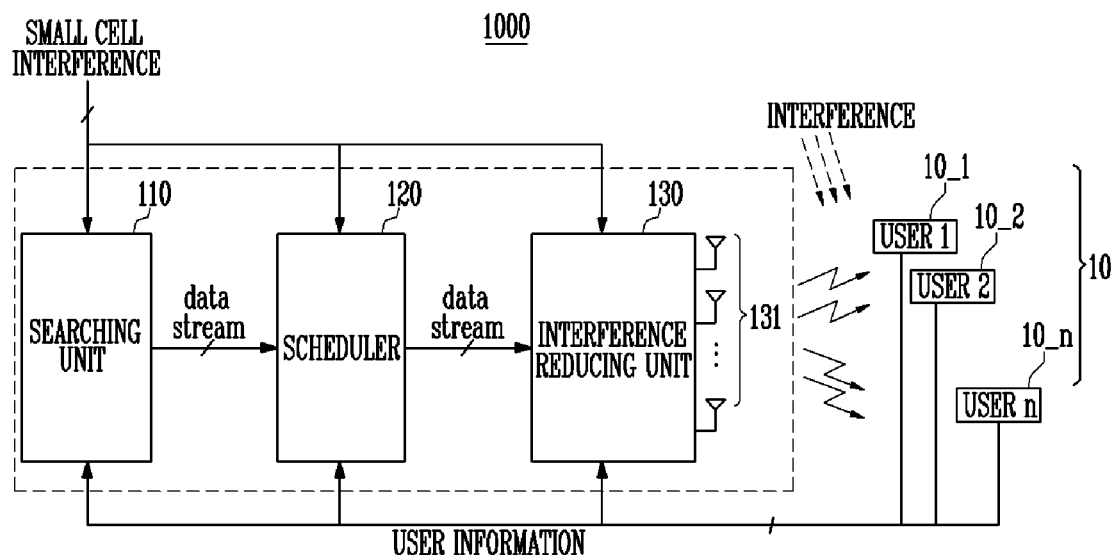
FIG. 2 is a block diagram illustrating an example of a wireless communication apparatus, and a method of reducing interference thereof according to an exemplary embodiment of the present invention.

FIG. 2 is a block diagram illustrating an example of a wireless communication apparatus, and a method of reducing interference thereof according to an exemplary embodiment of the present invention. Referring to FIG. 2, a small cell system 1000 includes a wireless communication apparatus 100 and a plurality of users 10. Here, the plurality of users 10 includes a plurality of user terminals 10_1, 10_2, . . . , and 10_n, each of which is capable of performing data communication with the wireless communication apparatus 100. Further, the wireless communication apparatus 100 includes a searching unit 110, a scheduler 120, and an interference reducing unit 130.

In FIG. 2, the small cell system 1000 includes the plurality of users 10 registered in the corresponding cell 1000, and the wireless communication apparatus 100 for providing a communication service to the plurality of users 10. When the wireless communication apparatus 100 performs data communication with the plurality of users 10, the data communication may have a problem by interference from adjacent surrounding small cells. Accordingly, the wireless communication apparatus 100 adopts the interference reducing scheme for reducing interference from surrounding small cells, and in this case, the wireless communication apparatus 100 refers to small cell information and user information to minimize the number of neighboring small cells to be considered when adopting the interference reducing scheme, and decreasing the number of necessary calculations and calculation complexity. Further, the wireless communication apparatus 100 may allocate the communication resource to each of the user by referring to the channel states of the users or the maximum number of transmission streams, thereby optimizing performance of the system and maximally using a capacity of the system.

A detailed configuration of the wireless communication apparatus 100 will be described below.

The searching unit 110 determines neighboring small cells, to which the interference reducing scheme is to be applied, among surrounding small cells. In this case, the searching unit 110 determines only the minimum number of small cells within the limit meeting the demanded performance of each of the users 10 as the neighboring small cells by referring to the small cell information and the user information.

Particularly, the searching unit 110 receives the user information indicating demanded transmission capacities and current SINRs for each stream of the users 10, and the like from a macro cell (not shown) or the users 10. Here, the macro cell is a cell, which takes charge of a region of a relatively large range, and has high power and a wide coverage, and may provide the small cell system 1000 with information about surrounding small cells or relay interaction between the small cell system 1000 and the surrounding small cell. Further, the searching unit 110 receives the small cell information indicating the small cell (surrounding small cell) influencing the small cell system 1000 and position information about the small cell from the macro cell or a white space database.

Further, the searching unit 110 calculates a current transmission capacity of each of the users by referring to the maximum number of transmission streams of each of the users 10 and the SINR for each stream of each of the users. In this case, the SINR for each stream is determined considering interference power from the surrounding small cells. A detailed method of calculating, by the searching unit 110, the current transmission capacity will be described below with reference to FIG. 3.

Further, the searching unit 110 compares the demanded transmission capacity of each of the users 10 and the current transmission capacity, and when the current transmission capacity is smaller than the demanded transmission capacity, the searching unit 110 determines a small cell having the largest amount of interference among the surrounding small cells as a neighboring small cell. Further, the searching unit 110 calculates the SINR for each stream and the current transmission capacity again, and compares the demanded transmission capacity of each of the users 10 and the current transmission capacity according to a result of the calculation again, based on the remaining small cells, except for the neighboring small cell determined among the surrounding small cells. By repeating the aforementioned method, the searching unit 110 sequentially determines a neighboring small cell in an order of the large amount of interference until the current transmission capacity of each of the users 10 is larger than the demanded transmission capacity.

In this case, the amount of interference of the surrounding small cell exerted on each of the users 10 may be a value estimated or calculated by the searching unit 110, and a method of estimating or calculating the amount of interference of the surrounding small cells is widely known in the technical field in the art, so that a description thereof will be omitted herein.

The scheduler 120 receives the user information indicating current channel information of each of the users 10 from the macro cell or the plurality of users 10, and then allocates the communication resource (or the data stream) to the users 10 in an order of a large SINR for each data stream.

Particularly, the scheduler 120 receives a current channel matrix and a current SINR for each stream of each of the users 10 from the macro cell or the users 10, and receives current channel matrixes of users subscribing to the neighboring small cell from the macro cell or the neighboring small cells.

Further, for example, the scheduler 120 aligns the respective data streams in an order of a large SINR of the users 10, selects (or matches) a user having the largest SINR for each data stream, and compares the maximum number of transmission streams and the number of selected data streams for each user. As a result of the comparison, when the number of data streams selected for each user does not exceed the maximum number of transmission streams, the data streams selected for each user are allocated to each of the users as they are. However, when the number of data streams selected for a specific user exceeds the maximum number of transmission streams of the specific user, the number of data streams selected for the specific user is adjusted so as not to exceed the maximum number of transmission streams of the specific user. A detailed method of adjusting the number of selected data streams will be described below with reference to FIG. 4.

When the allocation or the adjustment of the data stream for each user is completed, an interference reducing operation is performed by the interference reducing unit 130.

The interference reducing unit 130 transmits the data stream to the users 10 by adopting the interference reducing scheme. The interference reducing unit 130 may perform a calculation or an algorithm necessary for applying the interference reducing scheme, and include a separate processor (not shown) for a computing calculation.

Particularly, the interference reducing unit 130 applies the scheme of reducing interference from the neighboring small cells to the data streams by referring to the channel matrixes of the neighboring small cells determined by the searching unit 110, and then transmits the corresponding data stream to each of the users 10. In this case, the interference reducing schemes widely known in the technical field in the art may be used as the method of reducing the interference from the neighboring small cells. For example, the interference reducing schemes may include an interference alignment method, a ZF pre-processing method, and other general interference reducing schemes. The type of interference reducing schemes applicable to the interference reducing unit 130 of the present invention may be very various, and detailed contents thereof are widely known in the technical field in the art, so that a detailed description thereof will be omitted herein.

According to the exemplary embodiment of the present invention, the wireless communication apparatus 100 determines only the necessary small cells for meeting demanded performance of each of the users as the neighboring small cells, thereby minimizing the number of neighboring small cells which are considered when applying the interference reducing scheme. Accordingly, the number of calculations to be performed by the wireless communication apparatus 100 and calculation complexity are minimized. Further, the data is transmitted by preferentially allocating the communication resource (or the data stream) in the order of the user having a good channel situation, thereby optimizing performance of the small cell system 1000, and maximally using a capacity of the small cell system 1000.

Figure 3:
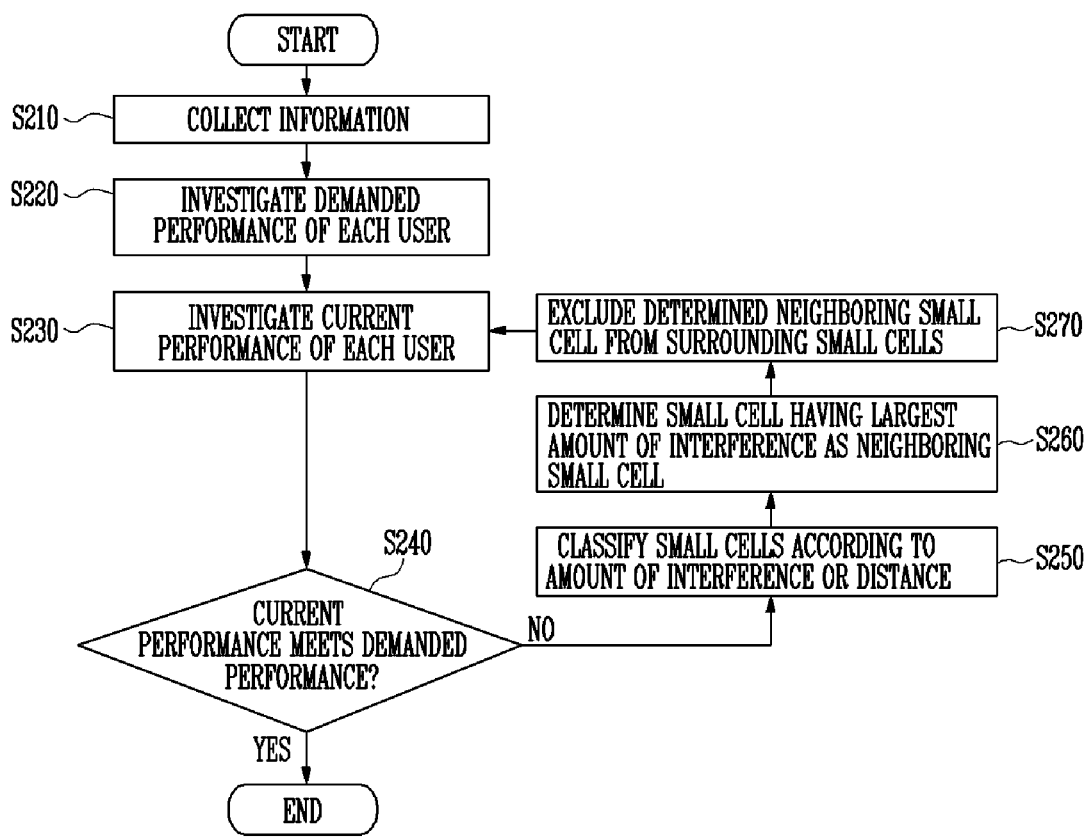
FIG. 3 is a flowchart illustrating an example of a method of searching for a neighboring small cell according to the exemplary embodiment of the present invention.

FIG. 3 is a flowchart illustrating an example of a method of searching for a neighboring small cell according to the exemplary embodiment of the present invention. The method of searching for a neighboring small cell of FIG. 3 may be specified operation S110 of FIG. 1. Referring to FIG. 3, the method of searching for a neighboring small cell includes operation S210 to S270.

In operation S210, the wireless communication apparatus 100 (see FIG. 2) collects information necessary for searching for a neighboring small cell from the outside. In this case, the collected information may include user information collected from the macro cell or the users 10 (see FIG. 2), or small cell information collected from the macro cell or surrounding small cells. Detailed contents of the user information or the small cell information are the same as those described with reference to FIG. 2.

In operation S220, the wireless communication apparatus 100 investigates demanded performance of each of the users 10 from the collected information. In this case, the demanded performance of each of the users 10 is, for example, a demanded transmission capacity of each of the users 10, and may be different for each user.

In operation S230, the wireless communication apparatus 100 calculates or investigates current performance of each of the users 10 by referring to the collected information. The current performance of each of the users 10, which is the current transmission capacity of each of the users 10, may be calculated by referring to the maximum number of transmission streams of each of the users and an SINR for each stream of each of the users. For example, the current transmission capacity of each of the users 10 may be calculated according to Equation 1.

$$C_u = \sum_{i=1}^{S_u} \log_2(1 + \gamma_i^u) \quad \text{[Equation 1]}$$

Here, $C_u$ is a current transmission capacity of a $u^{th}$ user ($1 \leq u \leq n$), $S_u$ is the maximum number of transmission streams of a $u^{th}$ user, and Y is an SINR for an $i^{th}$ stream of a $u^{th}$ user. In this case, $\gamma_i^u$ is a value designed or calculated so as to include interference power or interference effects by the surrounding small cells.

In operation S240, the wireless communication apparatus 100 compares the demanded performance and the calculated current performance for each user. When the calculated current performance meets the demanded performance, that is the current transmission capacity is equal to or larger than the demanded transmission capacity, the wireless communication apparatus 100 terminates the method of searching for the neighboring small cell. Otherwise, the method of searching for the neighboring small cell proceeds to operation S250.

In operation S250, the wireless communication apparatus 100 classifies the surrounding small cell according to the amount of interference or the distance by referring to the estimated or calculated amount of interference of each small cell according to the small cell information.

In operation S260, the wireless communication apparatus 100 determines a small cell having the largest amount of interference or a small cell closest to the wireless communication apparatus 100 among the classified small cells.

In operation S270, the wireless communication apparatus 100 excludes the determined neighboring small cell from the surrounding small cells. When operation S270 is terminated, the method of searching for the neighboring small cell returns to operation S230, and the current transmission capacity (or the current performance) of each of the users 10 is calculated or investigated again. In this case, the wireless communication apparatus 100 calculates or investigates the current transmission capacity again based on the surrounding small cell except for the neighboring small cell, so that the value ($\gamma_i^u$ of Equation 1) of the SINR of each of the users 10 is relatively increased, and thus the calculated value of the current transmission capacity is also increased.

Operations S230 to S270 are repeatedly performed until the current performance of each of the users 10 meets the demanded performance, and the neighboring small cell is sequentially determined according to the amount of interference or the distance during the repetition of the operations (S250).

According to the aforementioned exemplary embodiment of the present invention, it is possible to select only a minimum of neighboring small cells within a limit meeting the demanded performance of each user.

Figure 4:
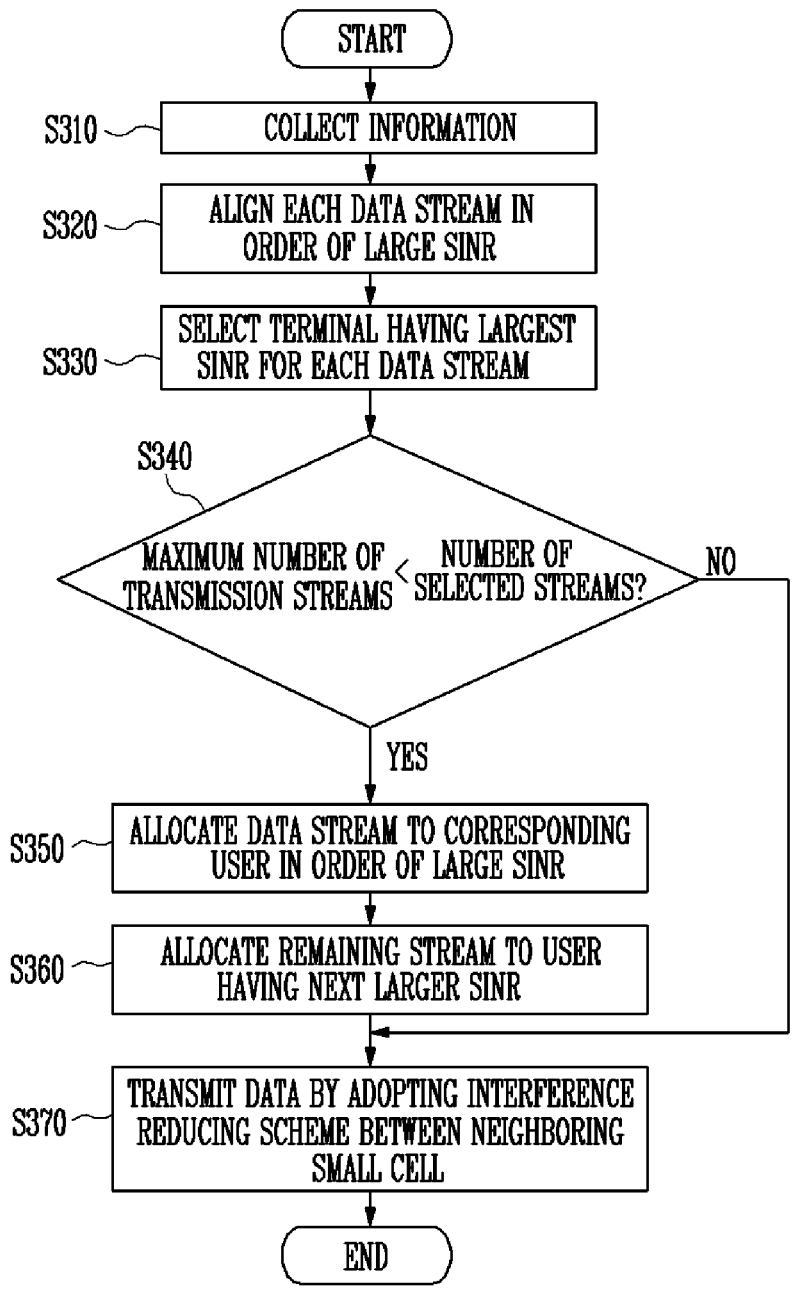
FIG. 4 is a flowchart illustrating an example of a scheduling method according to an exemplary embodiment of the present invention.

FIG. 4 is a flowchart illustrating an example of a scheduling method according to an exemplary embodiment of the present invention. The scheduling method of FIG. 4 may be specified operation S120 of FIG. 1. Referring to FIG. 4, the scheduling method includes operations S310 to S370.

In operation S310, the wireless communication apparatus 100 (see FIG. 2) collects information necessary for searching for a neighboring small cell from the outside. In this case, the collected information may include user information collected from the macro cell or the users 10 (see FIG. 2), or small cell information collected from the macro cell or surrounding small cells. Detailed contents of the user information or the small cell information are the same as those described with reference to FIG. 2.

In operation S320, the wireless communication apparatus 100 aligns each data stream in an order of a large SINR for the users 10.

In operation S330, the wireless communication apparatus 100 selects a user having the largest SINR ($\gamma_i^u$ of Equation 1) for each data stream. In this case, the method of selecting the user for each data stream may be expressed by Equation 2.

$$[u_i^+] = \max_u \gamma_i^u, \quad \text{[Equation 2]}$$
$$(1 \leq i \leq S)$$

Here, S indicates the maximum number of streams transmittable by the wireless communication apparatus 100, i indicates a data stream index of the wireless communication apparatus 100 (that is, i means a value for an $i^{th}$ data stream), and $u_i^+$ indicates a user index indicating that a $u^{th}$ user is selected for the $i^{th}$ data stream.

When the users are selected for all of the data streams, the scheduling method proceeds to step S340.

In operation S340, the wireless communication apparatus 100 compares the number of data streams selected for the corresponding users, and the maximum number of transmission streams of the user for each of the users 10 ($S_u$ of Equation 1). For example, when first, third, fifth, and eleventh streams select an nth user, the number of data streams selected for the $n^{th}$ user is 4. In this case, when the maximum number of transmission streams of the $n^{th}$ user is 2, the number of data streams selected for the $n^{th}$ user exceeds the maximum number of transmission streams. However, when the maximum number of transmission streams of the $n^{th}$ user is 5, the number of data streams selected for the $n^{th}$ user is smaller than the maximum number of transmission streams.

When the number of streams selected for all of the users is equal to or smaller than the maximum number of transmission streams, the selected streams are allocated to each of the users 10, and the scheduling method proceeds to operation S370. However, when the number of streams selected for a specific user exceeds the maximum number of transmission streams, the scheduling method proceeds to operation S350.

In operation S350, the wireless communication apparatus 100 allocates the data streams in an order of a large SINR for the corresponding user within the range of the maximum number of transmission streams for the user having the number of selected streams exceeding the number of maximum transmission streams.

In operation S360, the wireless communication apparatus 100 allocates the unallocated remaining data streams to another users in an order of a large SINR for a corresponding data stream, and when the number of data streams already selected for or allocated to another user is equal to or larger than the maximum number of transmission streams of another user, the corresponding data stream is allocated to another user of a next order. In this case, a method of allocating the remaining streams to other users may be expressed by Equation 3.

$$[u_{i'}^*] = \max_u \gamma_{i'}^u \quad \text{[Equation 3]}$$

Here, I' indicates an index indicating the remaining data stream of the wireless communication apparatus 100.

When all of the remaining data streams are completely allocated, the scheduling method proceeds to operation S370.

In operation S370, the wireless communication apparatus 100 transmits the data, to which the interference reducing scheme is applied between the wireless communication apparatus 100 and the neighboring small cell (for example, the neighboring small cell determined by the method of FIG. 3), to the users 10 based on the allocated data stream (or the number of allocated data streams) for each user. Detailed contents of the applied interference reducing method are the same as those described with reference to FIGS. 1 and 2.

According to the aforementioned exemplary embodiment of the present invention, the communication resource is preferentially allocated in the order of a user having a good channel situation (that is, a large SINR for the data stream), thereby improving performance and a capacity of the system.

Figure 5:
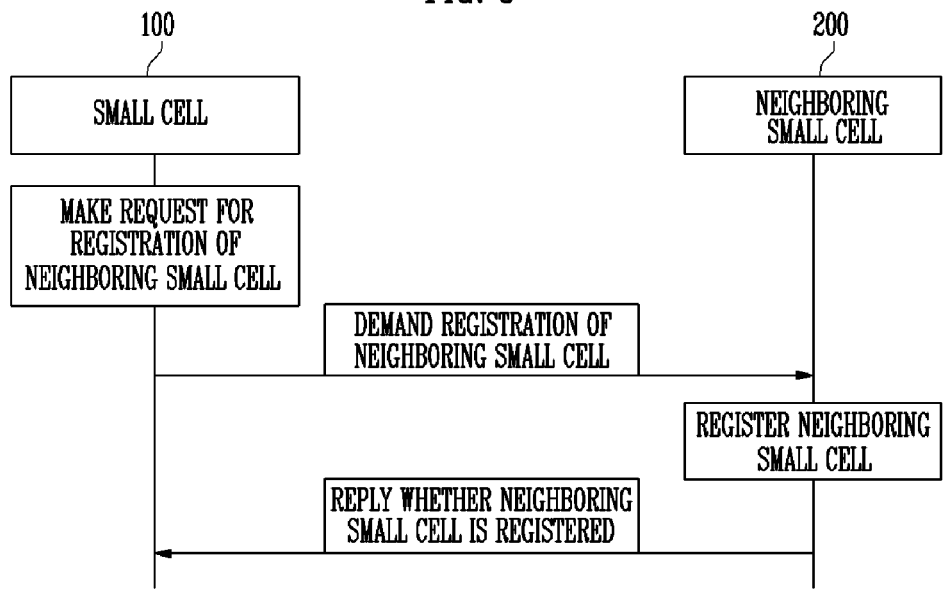
FIG. 5 is an interaction diagram schematically illustrating a method of registering a neighboring small cell according to an exemplary embodiment of the present invention.

FIG. 5 is an interaction diagram schematically illustrating a method of registering a neighboring small cell according to the exemplary embodiment of the present invention. In FIG. 5, a small cell 100 directly interacts with a neighboring small cell 200, and performs registration of a neighboring small cell.

First, the small cell 100 makes a neighboring small cell registration request to the determined neighboring small cell 200. The neighboring small cell registration request may be transmitted to another wireless communication apparatus of the neighboring small cell 200 from the small cell 100 (see FIG. 2).

Next, the neighboring small cell 200 registers the small cell 100 as the neighboring small cell thereof according to a predetermined method. As the exemplary embodiment, the neighboring small cell 200 may selectively authorize or reject the neighboring small cell registration according to demanded performance and current performance of a selected user u*.

Further, the neighboring small cell 200 replies information indicating whether the neighboring small cell is registered to the small cell 100.

Figure 6:
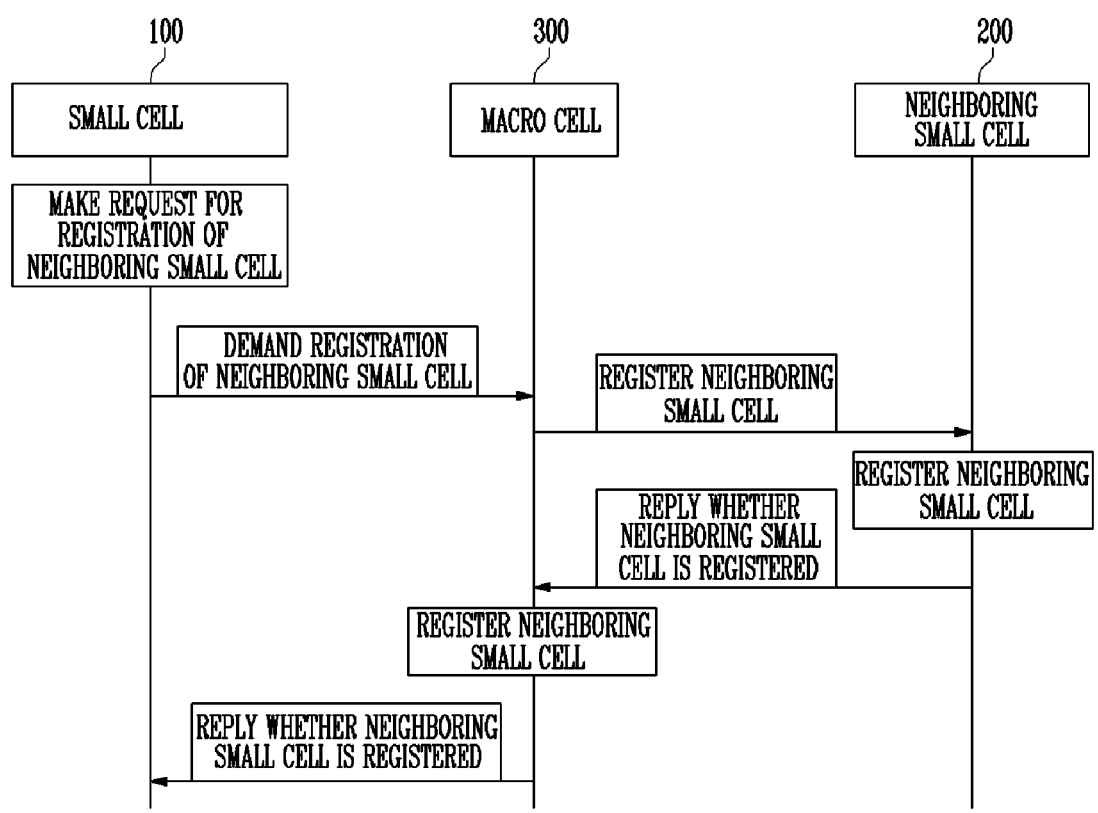
FIG. 6 is an interaction diagram schematically illustrating a method of registering a neighboring small cell according to another exemplary embodiment of the present invention.

FIG. 6 is an interaction diagram schematically illustrating a method of registering a neighboring small cell according to another exemplary embodiment of the present invention. In FIG. 6, the small cell 100 interacts the neighboring small cell 200 via a macro cell 3000 for registration of a neighboring small cell.

First, the small cell 100 transmits a neighboring small cell registration request to the macro cell 3000. The macro cell transmits the received neighboring small cell registration request to the determined neighboring small cell 200.

Next, the neighboring small cell 200 registers the small cell 100 as the neighboring small cell thereof according to a predetermined method. As the exemplary embodiment, the neighboring small cell 200 may selectively authorize or reject the neighboring small cell registration according to demanded performance and current performance of a selected user u*.

Further, the neighboring small cell 200 replies information indicating whether the neighboring small cell is registered to the macro cell 3000.

Further, the macro cell 3000 stores or registers a neighboring small cell registration relation between the small cell 100 and the neighboring small cell 200 by referring to the replied information indicating whether the neighboring small cell is registered.

Last, the macro cell 3000 replies information indicating whether the neighboring small cell is registered to the small cell 100.

FIG. 7 is a flowchart illustrating a method of authorizing registration of a neighboring small cell in stepwise according to exemplary embodiments of the present invention. Referring to FIG. 7, the method of authorizing registration of the neighboring small cell includes operations S410 to S450.

In operation S410, when the neighboring small cell 200 (see FIG. 5) receives the neighboring small cell registration request, the neighboring small cell 200 investigates demanded performance of the selected users. In this case, the demanded performance may be demanded transmission capacities of the selected users.

In operation S420, the neighboring small cell 200 investigates current performance of the selected users. In this case, the current performance may be current transmission capacities of the selected users. A method of calculating the current transmission capacities of the selected users may be expressed by Equation 4, similar to Equation 1.

$$C_{u^*} = \sum_{s=1}^{S_u^*} \log_2(1 + \gamma_s^{u^*}) \quad \text{[Equation 4]}$$

Here, u* indicates an index of the selected user.

In operation S430, the neighboring small cell 200 determines whether the current performance of the selected users meets the demanded performance. When the current performance of the selected users meets the demanded performance, the method of authorizing the registration of the neighboring small cell proceeds to operation S440. Otherwise, the method of authorizing the registration of the neighboring small cell proceeds to operation S450.

In operation S440, the neighboring small cell 200 authorizes the registration of the small cell 100 as the neighboring small cell thereof.

In operation S450, the neighboring small cell 200 rejects the registration of the small cell 100 as the neighboring small cell thereof.

According to the aforementioned exemplary embodiment of the present invention, the neighboring small cell may determine whether to register the small cell as the neighboring small cell thereof by referring to the demanded performance and the current performance of the selected user.

Although the specific exemplary embodiments have been described in the detailed description of the present specification, each exemplary embodiment may be modified into various forms without departing from the scope of the present specification.

Further, specific terms have been used, but are just used for the purpose of describing the present invention and are not used for defining the meaning or limiting the scope of the present invention, which is disclosed in the appended claims. Therefore, the scope of the present invention shall not be defined by the aforementioned exemplary embodiments, and shall be defined by the accompanying claims and equivalents thereof.

What is claimed is:

1. A method of reducing interference of a small cell including one or more users by a wireless communication apparatus, comprising:
    determining at least one neighboring small cell from surrounding small cells adjacent to the small cell according to an amount of interference or distance from the small cell, such that current performance of the one or more users satisfies demanded performance, the current performance being calculated based upon the interference of the surrounding small cells excluding the at least one neighboring small cell;
    allocating a communication resource to the one or more users according to a channel state of the one or more users subscribing to the small cell; and
    transmitting data to the one or more users, to which the communication resource is allocated, by adopting one or more interference reducing methods for reducing interference by the at least one neighboring small cell.

2. The method of claim 1, wherein the determining of the at least one neighboring small cell includes:
    determining at least one surrounding small cell having a largest amount of the interference for the small cell or a closest to the small cell among the surrounding small cells as the at least one neighboring small cell;
    calculating the current performance based upon the interference of the surrounding small cells excluding the at least one neighboring small cell;
    comparing the demanded performance and the current performance of the one or more users; and
    determining, when the current performance does not satisfy the demanded performance, at least one surrounding small cell having a second largest amount of the interference for the small cell or a second closest to the small cell among the surrounding small cells as the at least one neighboring small cell.

3. The method of claim 2, wherein the at least one surrounding small cells have a largest amount of interference for the small cell among the surrounding small cells.

4. The method of claim 2, wherein the at least one surrounding small cells are closest to the small cell among the surrounding small cells.

5. A method of reducing interference of a small cell including one or more users by a wireless communication apparatus, comprising:
    determining at least one neighboring small cell from surrounding small cells adjacent to the small cell according to an amount of interference or distance, such that current performance of the one or more users satisfies demanded performance, the current performance being calculated based upon the interference of the surrounding small cells excluding the at least one neighboring small cell;
    allocating a communication resource to the one or more users according to a channel state of the one or more users subscribing to the small cell; and
    transmitting data to the one or more users, to which the communication resource is allocated, by adopting one or more interference reducing methods for reducing interference by the at least one neighboring small cell,
    wherein the determining of the neighboring small cell includes:
        comparing the demanded performance and the current performance of the one or more users; and
        determining at least one surrounding small cells among the surrounding small cells as the at least one neighboring small cells according to a result of the comparison, and
    wherein the demanded performance is a demanded transmission capacity of the one or more users, the current performance is a current transmission capacity of the one or more users, and the current transmission capacity is calculated by referring to a signal to noise ratio of the one or more users for each data stream, and the maximum number of transmission streams of the one or more users.

6. The method of claim 5, wherein the current transmission capacity is calculated by $$C_u = \sum_{s=1}^{S_u} \log_2(1 + \gamma_i^u),$$

u is a natural number equal to or larger than 1 and equal to or smaller than n,
n indicates the number of one or more users,
i indicates an index of a data stream to be transmitted to the one or more users by the wireless communication apparatus,
$C_u$ indicates a current transmission capacity of a $u^{th}$ user among the one or more users,
$S_u$ indicates the maximum number of transmission streams of the $u^{th}$ user, and
$\gamma i^u$ indicates a signal to noise ratio for a stream of the $u^{th}$ user referring to the interference of the surrounding small cells excluding the at least one neighboring small cell.

7. The method of claim 2, wherein the determining of the at least one neighboring small cell further includes calculating the current performance again based upon the interference of the surrounding small cells excluding the at least one neighboring small cell.

8. The method of claim 1, further comprising: receiving user information or small cell information from a macro cell, the one or more users, or the one or more surrounding small cells.

9. A wireless communication apparatus that reduces interference of a small cell including one or more users, comprising:
    a searching unit configured to determine at least one neighboring small cell from surrounding small cells adjacent to the small cell according to an amount of interference or distance from the small cell, such that current performance of the one or more users satisfies demanded performance, the current performance being calculated based upon the interference of the surrounding small cells excluding the at least one neighboring small cell;
    a scheduler configured to allocate a communication resource to the one or more users according to a channel state of the one or more users subscribing to the small cell; and
    an interference reducing unit configured to reduce the interference by the neighboring small cell in order to transmit data to the one or more users to which the communication resource is allocated.

\* \* \* \* \*